United States Patent [19]

Gutsche

[11] 4,011,099

[45] Mar. 8, 1977

[54] PREPARATION OF DAMAGE-FREE SURFACE ON ALPHA-ALUMINA

[75] Inventor: Henry W. Gutsche, St. Louis, Mo.

[73] Assignee: Monsanto Company, St. Louis, Mo.

[22] Filed: Nov. 7, 1975

[21] Appl. No.: 629,949

[52] U.S. Cl. .............................. 134/7; 151/308; 151/317; 151/319; 151/323; 106/3; 134/28; 156/645; 252/79.1; 252/79.2

[51] Int. Cl.$^2$ ................... B08B 7/00; C23G 1/36

[58] Field of Search ............... 156/2, 6, 20; 134/7, 134/19, 26, 28; 51/307, 308, 309, 317, 319, 323; 106/3; 252/79.1, 79.2

[56] References Cited

UNITED STATES PATENTS

| | | |
|---|---|---|
| 3,071,455 | 1/1963 | Harman et al. .................. 134/7 |
| 3,170,273 | 2/1965 | Walsh et al. ..................... 51/281 |
| 3,429,080 | 2/1969 | Wachapelle ..................... 106/3 |
| 3,485,608 | 12/1968 | Cecil ............................. 51/308 |
| 3,546,036 | 12/1970 | Manasevit ...................... 156/2 |
| 3,715,842 | 2/1973 | Tredinnick et al. ............. 51/308 |
| 3,808,065 | 4/1974 | Robinson et al. ............... 156/6 |
| 3,878,005 | 4/1975 | Warren et al. .................. 156/2 |

*Primary Examiner*—William A. Powell
*Assistant Examiner*—Jerome W. Massie
*Attorney, Agent, or Firm*—Peter S. Gilster

[57] ABSTRACT

A chemical polishing process for alpha-alumina utilizing a silica colloid polishing fluid which is both a reactant and a medium for the removal of the reaction product is disclosed.

10 Claims, No Drawings

PREPARATION OF DAMAGE-FREE SURFACE ON ALPHA-ALUMINA

BACKGROUND OF THE INVENTION

1. Field of the Invention

This invention relates to the polishing of a surface of alpha-alumina, commonly referred to as sapphire.

2. Prior Art

Prior art methods for the polishing of an alpha-alumina surface include mechanical processes whereby the alpha-alumina is shaped by cutting with a diamond-impregnated saw blade, and polished with successively finer grades of diamond or carborundum powders. However, diamond-polished surfaces carry work-damage to a depth at least equal to the size of the diamond particle used in the polish. Damage may even extend beneath the alpha-alumina surface.

When alpha-alumina is used as an insulating substrate in electronic applications such as semiconductor devices, transistors or microcircuits, the quality of the final product depends mainly on the characteristics of the semiconductor film which, in turn, depends directly on the flatness and damage-free qualities of the substrate.

The mechanically polished alpha-alumina surface may then be finished by "healing" the surface damage in an annealing process at temperatures above 1200° C in hydrogen. Alternatively, the mechanical damage may be removed chemically. Chemical polishing has been reported in the *British Journal of Applied Physics*, Volume 18, pages 1357–1382 (1967) in an article entitled, "Single-Crystal Films of Silicon on Insulators", by J. D. Filby and S. Nielsen. The chemical methods involve etching with molten materials such as lead fluoride, potassium persulphate in boric oxide, borax, anhydrous HCl, sulfur fluorides and silicon vapors. However, these processes require high temperatures such as 1000° C for borax and 1400° C for anhydrous HCl. Further, the additional disadvantage of the formation of a residue which is difficult to remove has been reported when using borax.

An example of chemical etching is found in U.S. Pat. No. 3,753,775 which utilizes borax vapors at temperatures between 1000° C and 1200° C. A significant disadvantage of this process is the necessity of providing materials for the apparatus which will not react with borax at high temperatures. Thus, the material suggested in this method is platinum, the use of which constitutes a significant economic disadvantage.

SUMMARY OF THE INVENTION

An object of this invention is a polishing process for the preparation of an undamaged surface on alpha-alumina.

A further object of this invention is a completely chemical polishing process for alpha-alumina without the necessity of preliminary mechanical polishing.

A still further object of this invention is a chemical polishing process for alpha-alumina which is effective at lower temperatures than those of the prior art.

The foregoing and other objects of the invention are attained by providing a chemical polishing process for alpha-alumina utilizing a silica colloid polishing fluid which is both a reactant and a medium for the removal of the reaction product.

DESCRIPTION OF THE PREFERRED EMBODIMENT

It has been found that a chemical reaction between silica and alpha-alumina proceeds to render possible a chemical polishing method for alpha-alumina at relatively low temperatures.

The alpha-alumina surface to be polished is preferably in the form of a thin wafer cut from a sapphire boule by means of a diamond-impregnated saw blade. In order that no diamond particles can be carried over into the chemical polishing sequence, all "raw" alpha-alumina wafers are heated to about 1000° C for about 10 minutes in oxygen to oxidize any diamond present.

The polishing fluid is a colloidal silica fluid, preferably a hydrated silica colloid in a solvent such as water. Fluids with 10–50% solids content are preferred. The polishing fluid of this invention has two primary purposes. The first is to carry the $SiO_2$ reactant to the surface of the alpha-alumina and the second is to transport the product of the reaction away from the thus-polished alpha-alumina face. While the reaction is not completely understood, it is believed to proceed as follows:

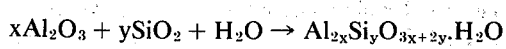

$$xAl_2O_3 + ySiO_2 + H_2O \rightarrow Al_{2x}Si_yO_{3x+2y}.H_2O$$

Preferred silica polishing fluids are the SYTON colloidal suspensions of hydrated silica in water, manufactured by Monsanto Company. Since $Al_2O_3$ displays an amphoteric nature, it is not surprising that the reaction proceeds most rapidly at a pH of about 7. However, since SYTON has a pH of about 10.5, an acid is preferably added to the colloidal silica fluid before use. While acids such as sulfuric acid have been used, hydrochloric acid is preferred. The pH of the polishing fluid used is preferably 7 to 8.

Thus, while silica, having a hardness of about 7 on the Moh's scale, has been known to be an effective mechanical polishing agent for materials having a Moh's scale hardness of 2 to 7, it has been found in accordance with this invention that a silica colloid can provide a superior polished surface on alpha-alumina by chemical action. Further, since the hardness of the alpha-alumina greatly exceeds that of the silica, no fragmentation can occur.

The above reaction is endothermic to the extent of about 14.6 K Cal/Mole at 400° K, and thus the speed depends on the heat supplied. Since all protruding portions of the surface of the alpha-alumina wafer receive more local frictional heat and are subject to more fluid removal action than the non-protruding portions, damaged areas react faster and are removed faster than non-damaged areas.

Related to the problem of damage is the appearance of contamination on the surface. As the protrusions and depressions are eliminated, the tendency of the surface to retain contamination is also lessened and easier cleaning results. Thus, the three factors which most interfere with the performance of the final product — damage, contour and contamination — are significantly affected by the process of this invention.

After removal of the alpha-alumina wafer from the oxidizing treatment for removal of diamond particles described above, the cooled wafer is polished with the colloidal silica fluid and a polishing cloth or other material under pressure to create frictional heat sufficient to maintain the desired rate of reaction and thus a desired rate of surface removal. The pressure used can vary according to the thickness of the wafer. For a wafer 2 inches in diameter and 350 microns thick, pressures of 20 – 30 kg will suffice. Pressures should preferably be adjusted so that the temperature on the surface of the polishing turntable used is about 80° C, although temperatures of 60°–100° C can be maintained.

After polishing with the colloidal silica fluid, the fluid residues can be removed by an immersion in hydrofluoric acid followed by a rinse with deionized water.

The finished product can then find application as an insulating substrate for high performance, silicon-on-sapphire semiconductor devices, transistors and microcircuits in particular. The semiconductor applied to the finished wafer can be a thin, e.g., less than 1 micron, (100)-oriented film which is heteroepitaxially deposited on the alpha-alumina surface.

To illustrate the operation of this invention, the following example is given which should in no way be construed as a limitation on the scope of the disclosure herein.

EXAMPLE

Four circular alpha-alumina sawed blanks, 2 inches in diameter, 350 microns thick are placed in a semiconductor oxidation furnace for 10 minutes. After withdrawal from the furnace and cooling, the blanks are pressed against a circular polishing block 5 inches in diameter, ¾ inch thick. The block surface (=underside) carries a wet fabric, for example Buehler Microcloth. The topside of the block has in its center a ¾ inch × ¾ inch circular opening which is lined by a ⅛ inch thick nylon bearing. The polishing block — wafer side down — is then placed and pressed against the turntable of a polishing machine by means of a pin which is affixed to a pressurized arm. The turntable is covered with a napless polishing fabric, for example Pellon 3480 H paper adhesive mounted. This polishing fabric, cloth or paper is capable of carrying polishing fluid to and wetting the alpha-alumina surfaces while the turntable rotates at about 300 RPM. The polishing fluid consists of 25% "SYTON HT 40" with water, having a pH between 7 and 8 and a particle size of 250 – 300 Angstroms. The polishing fluid is dispensed on the center of the turntable at a rate of 50 ml/min. The pressure on the polishing block is adjusted so that the temperature on the surface of the turntable remains near about 80° C. Polishing, i.e. stock removal, proceeds then in dependence on the degree of damage in the alpha-alumina surface ranging in rate from 40 to 20 microns/hr. Completion of polish is checked by examining the finished surface at 110× magnification under a metallographic microscope such as Reichert or Leitz. With phase contrast illumination variations from flatness as little as 30 A can be detected with a Nomarski attachment. A featureless appearance of the surface indicates absence of damage.

While the above invention has been described in its preferred embodiment, it is to be understood that the words used are words of description rather than of limitation, and that changes within the purview of the appended claims may be made without departing from the true scope and spirit of the invention.

What is claimed is:

1. A process for preparing an undamaged surface on alpha-alumina comprising polishing an alpha-alumina surface with a colloidal silica fluid.

2. A process as claimed in claim 1, wherein said fluid comprises colloidal silica in water.

3. A process as claimed in claim 2, wherein said fluid has a pH of about 7 to 8.

4. A process as claimed in claim 2, wherein said fluid further comprises hydrochloric acid.

5. A process as claimed in claim 2, wherein said colloidal silica has a particle size of 250 – 300 Angstroms.

6. A process for preparing an undamaged surface on alpha-alumina comprising the steps of:
   a. shaping the alpha-alumina with a diamond-impregnated saw blade;
   b. heating to about 1000° C in oxygen until all traces of diamond are removed;
   c. polishing with a colloidal silica fluid under pressure;
   d. immersing the alpha-alumina in hydrofluoric acid; followed by
   e. rinsing in deionized water.

7. A process as claimed in claim 6, wherein said fluid comprises colloidal silica in water.

8. A process as claimed in claim 6, wherein said fluid has a pH of about 7 to 8.

9. A process as claimed in claim 6, wherein said fluid further comprises hydrochloric acid.

10. A process as claimed in claim 6, wherein said colloidal silica has a particle size of 250 – 300 Angstroms.

* * * * *